(12) United States Patent
Kozloski et al.

(10) Patent No.: US 11,137,884 B2
(45) Date of Patent: Oct. 5, 2021

(54) MODIFYING AN APPEARANCE OF A GUI TO IMPROVE GUI USABILITY

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 15/181,772

(22) Filed: Jun. 14, 2016

(65) Prior Publication Data
US 2017/0357518 A1    Dec. 14, 2017

(51) Int. Cl.
*G06F 3/048* (2013.01)
*G06F 3/0484* (2013.01)
*G06F 3/01* (2006.01)
*G06F 9/451* (2018.01)
*G06T 11/60* (2006.01)
*G06F 3/041* (2006.01)
*G06F 3/0481* (2013.01)
*G06F 3/0489* (2013.01)
*G06N 20/00* (2019.01)

(52) U.S. Cl.
CPC ............ *G06F 3/0484* (2013.01); *G06F 3/013* (2013.01); *G06F 3/015* (2013.01); *G06F 3/0418* (2013.01); *G06F 3/04812* (2013.01); *G06F 3/04897* (2013.01); *G06F 9/451* (2018.02); *G06N 20/00* (2019.01); *G06T 11/60* (2013.01); *G06F 2203/011* (2013.01); *G06T 2200/24* (2013.01)

(58) Field of Classification Search
CPC ........ G06F 3/0484; G06F 3/013; G06F 3/015; G06F 3/0418; G06F 3/04812; G06F 3/04897; G06F 9/451; G06F 2203/011; G06N 99/005; G06T 11/60; G06T 2200/24
See application file for complete search history.

(56) References Cited

U.S. PATENT DOCUMENTS

| 5,886,683 A | * | 3/1999 | Tognazzini | ............. | G06F 3/013 345/156 |
| 5,898,423 A | * | 4/1999 | Tognazzini | ............. | G06F 3/013 345/158 |
| 6,275,829 B1 | | 8/2001 | Angiulo et al. | | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Haoshian Shih
(74) *Attorney, Agent, or Firm* — Law Office of Jim Boice

(57) ABSTRACT

A method, system, and/or computer program product modifies an appearance of a graphical user interface (GUI) for a user. One or more processors determine a user context and a cognitive state of a user and identify a preferred focal point for the user. The processor(s) adjust a visual style of an image according to the determined user context and cognitive state of the user and the identified focal point for the user, and then present a graphical user interface that displays the image to the user using the adjusted visual style.

18 Claims, 7 Drawing Sheets

(56) References Cited

U.S. PATENT DOCUMENTS

| | | | |
|---|---|---|---|
| 6,608,615 B1* | 8/2003 | Martins | G06F 16/9577 |
| | | | 345/156 |
| 6,714,963 B1* | 3/2004 | Levine | G06Q 10/00 |
| | | | 709/203 |
| 7,454,711 B2 | 11/2008 | Angiulo et al. | |
| 7,673,229 B1 | 3/2010 | Pearson et al. | |
| 8,195,203 B1* | 6/2012 | Tseng | H04M 1/72569 |
| | | | 455/457 |
| 8,577,166 B1* | 11/2013 | Ferguson | G06F 3/04845 |
| | | | 382/255 |
| 8,823,740 B1* | 9/2014 | Amirparviz | G02B 5/30 |
| | | | 345/633 |
| 8,908,987 B1* | 12/2014 | Krishnaswamy | G06T 5/00 |
| | | | 382/260 |
| 9,116,868 B2 | 8/2015 | Pearson et al. | |
| 2003/0038832 A1* | 2/2003 | Sobol | G06T 11/60 |
| | | | 715/722 |
| 2005/0219694 A1* | 10/2005 | Vesely | H04N 13/122 |
| | | | 359/463 |
| 2006/0072166 A1* | 4/2006 | Fuchs | G06T 11/60 |
| | | | 358/452 |
| 2008/0228689 A1* | 9/2008 | Tewary | H04N 7/17318 |
| | | | 706/48 |
| 2009/0313679 A1* | 12/2009 | McAfee | G06Q 10/02 |
| | | | 726/3 |
| 2011/0006978 A1* | 1/2011 | Yuan | G06F 3/013 |
| | | | 345/156 |
| 2011/0072257 A1* | 3/2011 | Milchtaich | G06F 9/451 |
| | | | 713/100 |
| 2011/0254687 A1* | 10/2011 | Arponen | H04M 1/72525 |
| | | | 340/540 |
| 2012/0008875 A1 | 1/2012 | Martensson | |
| 2012/0280901 A1* | 11/2012 | Kim | G06F 3/017 |
| | | | 345/156 |
| 2012/0326969 A1* | 12/2012 | Ramanathan | G06F 3/013 |
| | | | 345/156 |
| 2013/0290993 A1* | 10/2013 | Cheung | H04N 21/4143 |
| | | | 725/10 |
| 2014/0160148 A1* | 6/2014 | Barkett | G06T 11/60 |
| | | | 345/619 |
| 2014/0310256 A1* | 10/2014 | Olsson | G06F 3/013 |
| | | | 707/706 |
| 2014/0372563 A1* | 12/2014 | Ke | H04L 41/0246 |
| | | | 709/218 |
| 2015/0106467 A1 | 4/2015 | Robarts et al. | |
| 2016/0063883 A1* | 3/2016 | Jeyanandarajan | G09B 7/08 |
| | | | 434/201 |
| 2017/0090739 A1* | 3/2017 | Kozuka | G06F 3/0482 |
| 2017/0098152 A1* | 4/2017 | Kerr | G06F 3/04842 |
| 2017/0139475 A1* | 5/2017 | Eivazi | G06F 3/013 |

OTHER PUBLICATIONS

Anonymous, "A Method of Using Key-Icons for Text Visualization", ip.com, IPCOM000210043D, Aug. 23, 2011, pp. 1-7.

Anonymous, "System and Method for Cognitive Shaping Via Visual Analysis", ip.com, IPCOM000244312D, Dec. 1, 2015, pp. 1-3.

M. Islam et al., "Channel Selection and Feature Extraction for Cognitive State Estimation With the Variation of Brain Signal", International Conference on Electrical Information and Communication Technology, 2013, IEEE, pp. 1-6.

* cited by examiner

MODIFYING AN APPEARANCE OF A GUI TO IMPROVE GUI USABILITY

BACKGROUND

The present disclosure relates to the field of graphical user interfaces (GUIs) used with software applications, and specifically to an appearance of GUIs. More specifically, the present disclosure relates to optimizing an appearance of a GUI to improve a user experience with the GUI.

SUMMARY

A method, system, and/or computer program product modifies an appearance of a graphical user interface (GUI) for a user. One or more processors determine a user context and a cognitive state of a user and identify a preferred focal point for the user. The processor(s) adjust a visual style of an image according to the determined user context and cognitive state of the user and the identified preferred focal point for the user, and then present a graphical user interface that displays the image to the user using the adjusted visual style.

DETAILED DESCRIPTION

Figure 1:
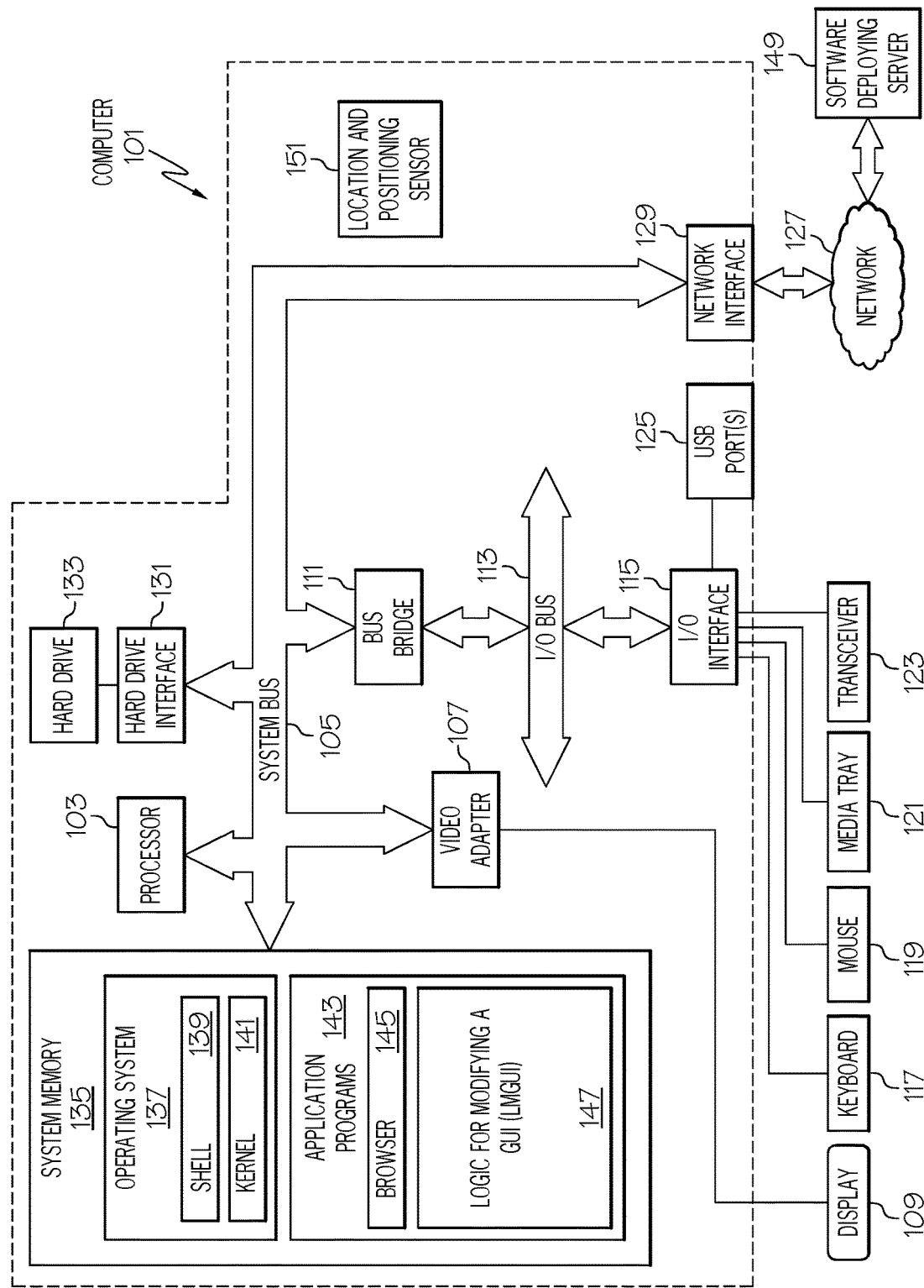
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1 and/or the vision sensor 206 shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Modifying a Graphical User Interface (LMGUI) 147. LMGUI 147 includes code for implementing the processes described below, including those described in FIGS. 2-5. In one embodiment, computer 101 is able to download LMGUI 147 from software deploying server 149, including in an on-demand basis, wherein the code in LMGUI 147 is not downloaded until needed for execution. In one embodiment of the present invention, software deploying server 149 performs all of the functions associated with the present invention (including execution of LMGUI 147), thus freeing computer 101 from having to use its own internal computing resources to execute LMGUI 147.

Also within computer 101 is a location and positioning sensor 151, which is able to detect the physical location of computer 101 and/or the orientation of computer 101. For example, location and positioning sensor 151 may incorporate global positioning system (GPS) sensors that identify the geophysical location of computer using signals from an array of space-based GPS satellites. Furthermore, location and positioning sensor 151 may identify a static IP address of computer 101, which can be mapped to a physical location. Furthermore, location and positioning sensor 151 may detect a 3-Axis (X, Y, Z) orientation/movement of computer, particularly when incorporated into the vision sensor 206 shown in FIG. 2. Furthermore, location and positioning sensor 151 may detect the distance and angular orientation between the test graphical user interface (GUI) 202 and the user 204 shown in FIG. 2 through the use of a combination of distance transceivers (e.g., transceivers that detect Doppler shifts and timing features when sending an electronic signal to and/or from the test GUI 202 and the vision sensor 206, etc.).

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Disclosed herein is a method, system, and computer program product that provides an automatic image and/or color selection system based on considerations of user context and cognitive state, and then the insertion of the generated/altered images into a graphical user interface (GUI), such as a Web page, an application display, etc.

The present invention utilizes considerations such as the color scheme being selected or morphed. For example, the colors of images displayed on the GUI may be adjusted to have minimal hues and muted colors, which may be preferred for certain users/viewers. Similarly, the images may be adjusted to present nostalgic references for other users/viewers.

In one or more embodiments, the present invention establishes/determines/estimates features of a user cohort for which certain visual adjustments are made. Such visual adjustment may be based on the user/system selecting a focal point of an image or GUI, and then adjusting images on that GUI or other GUIs based on the focal point of the image.

In one or more embodiments, the present invention selects an appropriate and/or effective number of images to be displayed, based on the detected requirements of the user.

In one or more embodiments, the present invention determines and implements an appropriate and/or effective image frame, bezel, or border for images displayed on the GUI based on detected requirements of the user.

In one or more embodiments, the present invention determines and implements an appropriate and/or effective presentation style for images displayed on the GUI based on detected requirements of the user. Such presentation styles include, but are not limited to, a vertically oriented gallery, a horizontally oriented gallery, a slide show gallery, and/or a montage gallery.

As further presented herein, a method, system, and computer program product create a pool of images for display in web pages based on considerations of user context and cognitive state. In one embodiment, the invention selects images for a Hyper Text Markup Language (HTML) document or related document based on user requirements.

Sometimes images are used on Web pages to make the pages more attractive or for informational purposes. Both purposes are particularly important when the Web site displaying the pages is a business site. A user is more likely to explore a web site that shows images of the items for sale. Furthermore, appropriate artistic image styles can make users feel comfortable and may set the mood and ambiance for a site. Therefore, the present invention advantageously provides for the dynamic selection of images for GUI images (e.g., Web pages) and for the automatic integration of the selected images based on considerations of user context and cognitive state.

In one or more embodiments, the present invention adjusts the image style based on the user's neurological state, age, etc. For example, certain neurological conditions create a preference for color schemes that use low light intensity with muted colors, since such neurological conditions cause light/color sensitivity.

Similarly, persons below a certain chronological age may prefer, and even be neurologically benefitted, by looking at images that use certain primary colors (e.g., red, blue, yellow, green). However, overuse of a single color (e.g., shading an entire GUI with the color red) may cause agitation in certain ages of users, especially younger users.

Similarly, persons above a certain chronological age may be drawn to images that evoke nostalgic memories. That is, images in sepia or other soft hues often invoke pleasant reminiscent memories in such persons.

Similarly, persons with certain experiences may immediately relate to, be attracted to, and/or otherwise prefer images of familiar places when incorporated into a Web page. For example, if a user has had a pleasant vacation in Australia or New Zealand, then a picture of the Tasman Sea will attract their attention, while a picture of the Atlantic Ocean may not (assuming that the pictures of these two bodies of water include some type of visual content that indicates/suggest where the pictures were taken).

Similarly, a user's social network history may indicate a user's stylistic preferences, which are then incorporated into images on the Web page being generated and displayed to the user.

Thus, the present invention enables a Web page to be dynamically modified according to the interests/attractions of a particular user/viewer.

In one or more embodiments of the present invention, a user is identified as being a member of a particular user cohort, that shares preferences for certain visual styles when presenting images on a GUI such as a Web page. Once such a cohort is determined and/or estimated, a selection of a focal point of the image is performed, and the image is adjusted based on the focal point of the image.

For example, for some user cohorts, a close up of a model's face may be attractive, but for others a zoom out to include more of the setting may be more effective and/or appropriate. Sometimes, an object may be preferentially in the center of a photo, but at other times, the user may prefer that the object be less centrally located.

As used herein, the term "focal point" is defined as a visual appearance of an image being displayed on a GUI. For example, a focal point of an image may be the centering, cropping and/or positioning of objects in a scene/photograph, or it may be the relative "crispness" versus "blurring" of the objects (i.e., analogous to the concept of depth of field in photography).

In one or more embodiments of the present invention, once a cohort is determined and/or estimated, a selection of an appropriate or effective number of images is performed. For example, for some cohorts, just one image is effective for capturing the interest of members of these cohorts.

However, for other cohorts, multiple images (e.g., of a particular quantity, such as seven) on a single Web page are deemed to be more effective in capturing the interest of members of these other cohorts.

Similarly, once a cohort is determined and/or estimated, a selection of an appropriate or effective image frame, bezel, or border may be determined.

Similarly, once a cohort is determined and/or estimated, a selection of an appropriate or effective presentation is determined, such as including a vertically oriented gallery, a horizontally oriented gallery, a slide show gallery, or a montage gallery.

Active learning and pre-seeding: Using active learning techniques and crowd-sourcing approaches, the system may learn about the user/group preferences. It can further anticipate and predict which images would work well for a given person, based on the activity of their network contacts. In one or more embodiments of this active learning and pre-seeding, Noise Tolerant Time-varying Factor Graphs are employed to track and predict which user(s) will access which content, thus leading to the pre-seeding of suitable images into the Web page.

As described herein, in an embodiment of the present invention eye tracking is used to determine a user's preferences for how images are presented on the Web page. In this embodiment, the invention utilizes eye tracking technology in a closed loop to: 1) determine the current image focal point (center of user's gaze), 2) based on user measures and objectives set by the image provider, determine a desired (new) focal point, 3) compute, using an estimating facility, a change in color balance, hue, or contrast in the image most likely to evoke a change in focus/gaze by the user, 4) modify the change in color to achieve the change, 5) measure the new center of user's gaze in the image, and 6) adapt the estimating facility thereby.

The present invention thus enables learned, customized, and/or improved GUIs for different cohorts (including people with certain neurological conditions and/or cognitive characteristics). When utilized with a tracking system, the center of the most likely eye position is modified when color balance and contrast is shifted. One or more embodiments of the present invention uses these subtle changes in image properties to control the gaze and focus of attention of a user in real time, thereby allowing, for example, an advertiser to move a viewer's gaze through a scene in a directed and controllable manner, all the while telling a story with the directed changes, or with additional media (for example sound and speech).

While the present invention has been described with reference to fixed images (e.g., a GUI, Web page, etc.), the techniques disclosed herein are also applicable to moving images (e.g., videos, motion pictures, animated Graphics Interchange Format (GIF) files, etc.), in order to influence the center of gaze of the viewer.

Besides being useful in marketing and artistic scenarios, the present invention is also useful in educational applications, such that the student is aided in focusing his/her attention on salient aspects of images, Web pages, educational material, etc. For example, someone with ADD (attention-deficit disorder) may desire and benefit from help (in the manner described herein) to move his or her gaze through a scene in a directed and controllable manner. This approach is also useful in aiding people (according to their cohort or measured responses, as described herein) to focus on salient features of a product for sale or scientific images in a technical journal.

Figure 2:
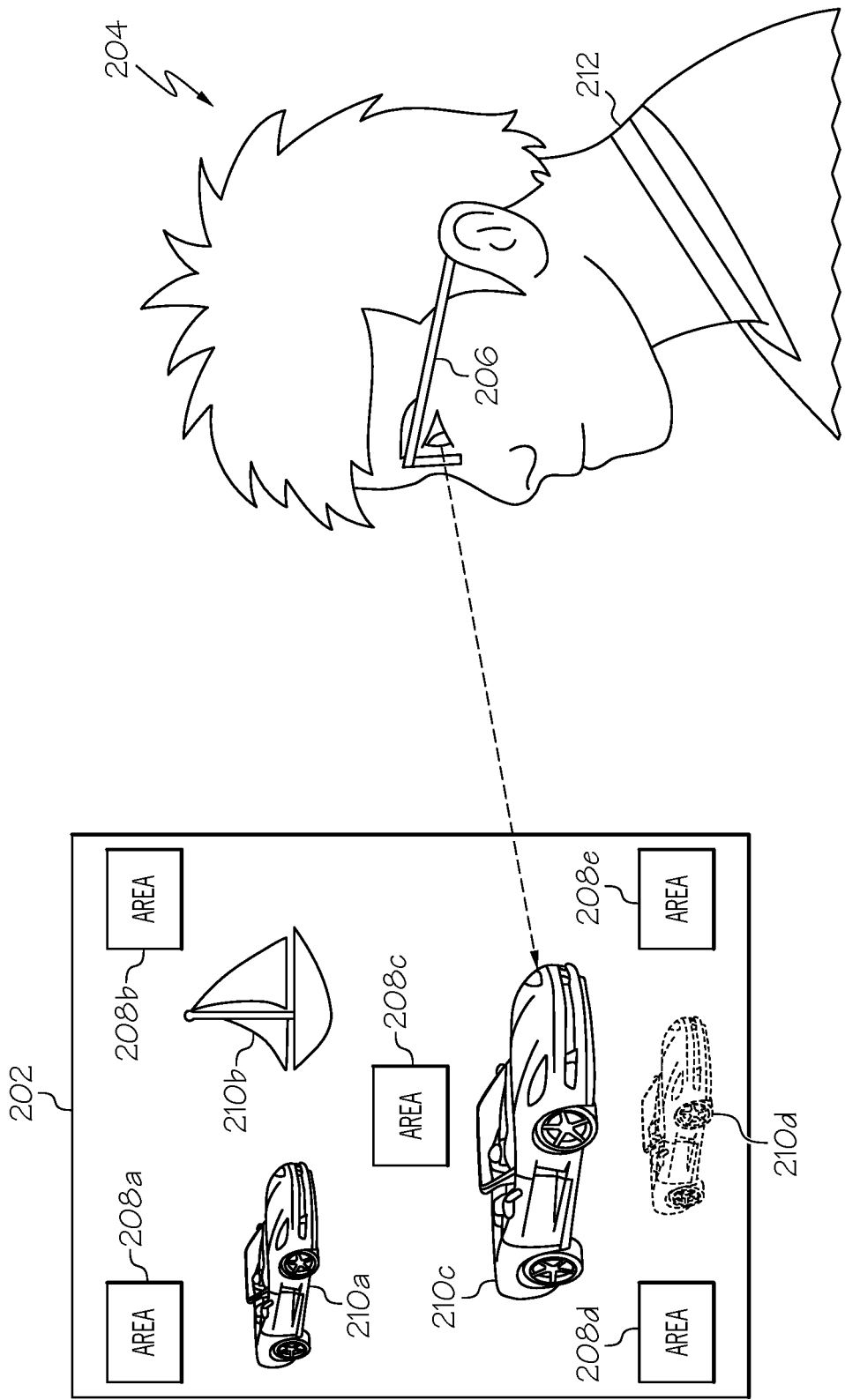
FIG. 2 illustrates an exemplary test graphical user interface (GUI) that detects a vision focus of a user upon the test GUI.

With reference now to FIG. 2, an exemplary test graphical user interfaces (GUI) 202 that detects a vision focus of a user 204 upon the test GUI 202 is presented.

A vision sensor 206 detects eye movement (e.g., using electromyography sensors that detect eye muscle, face muscle, and neck muscle movement along with accelerometers, positioning signals received from the test GUI 202 relative to the vision sensor 206, etc.) of the user 204. That is, the vision sensor 206 is able to detect where the user 204 is focusing his/her vision attention on the test GUI 202. Test GUI 202 may be displayed on a display, such as display 109 shown in FIG. 1. As used herein, the term "GUI" is used to describe any type of digital visual display, including that of a Web page, a screen display for an application, etc.

Thus, the vision sensor 206 is able to detect what "catches the eye" of user 204. For example, when shown test GUI 202, user 204 may be drawn to a particular area (e.g., one of areas 208a-208e) on the test GUI 202.

Similarly, the vision sensor 206 is able to determine that the user 204 has a preference for boats over cars if his vision/focus/attention is drawn to image 210b instead of image 210a.

Similarly, the vision sensor 206 is able to determine that the user 204 prefers larger images rather than smaller images of a same subject if his vision/focus/attention is drawn to image 210c instead of image 210a.

Similarly, the vision sensor 206 is able to determine that the user 204 prefers a muted image of the same subject if his image is drawn to image 210d instead of image 210a, and vice versa.

Similarly, if image 210d is not muted but is rather of a different color than image 210a, and the user's attention is drawn to image 210a, then the vision sensor 206 is able to determine that the user 204 prefers images that are of the color used in image 210a.

Thus, wherever the user 204 looks on the test GUI 202 will 1) identify the subject that he is interested in; 2) what type of visual appearance he prefers (e.g., size, color, muting, etc.); and/or 3) what area of the display/GUI is looked at first and/or with longer attention. This information can be used to 1) directly adjust GUIs being presented to user 204, and/or 2) place user 204 into a certain user cohort, from which pre-established criteria for the appearance of the GUI has been set.

Also depicted in FIG. 2 is a biometric sensor 212. Biometric sensor 212 is able to detect the physiological state of user 204. For example, biometric sensor 212 may be a skin galvanometer that detects a change in skin resistance caused by sweating, thus indicating a state of stress in user 204. Similarly, biometric sensor 212 may be an external heart monitor that measures a rate and/or rhythm of the heart of user 204, thus indicating whether user 204 is calm, agitated, physically taxed, etc. Similarly, biometric sensor 212 may be a respiration sensor that detects the breath rate of user 204, thereby indicating whether user 204 is calm, agitated, physically taxed, etc. Other biometric sensor types may be integrated into biometric sensor 212 to detect any physiological state of user 204 based on detected brain waves of user 204, chemical content of exhaled air by user 204, positioning (sitting up or lying down) of user 204, etc.

Figure 3:
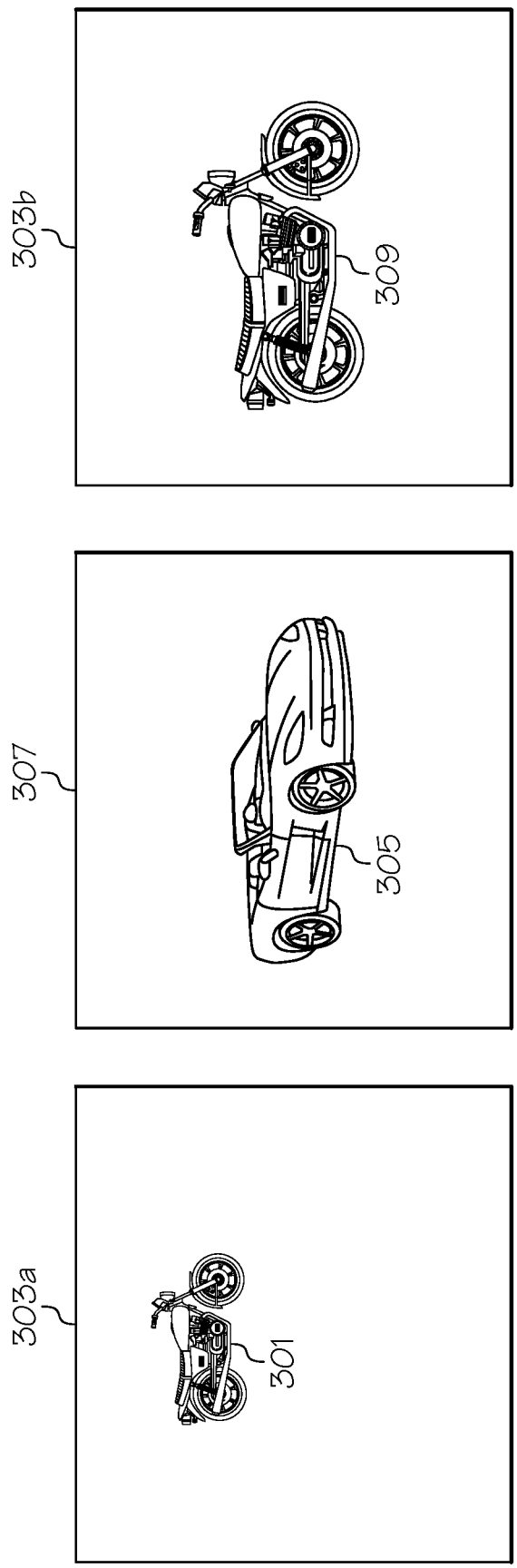
FIG. 3 depicts a second GUI being altered based on where the user looked on the test GUI shown in FIG. 2.

With reference now to FIG. 3, the information derived by the vision sensor 206 in FIG. 2 is used to adjust the appearance of items shown in the test GUI 202 and/or, preferably, to adjust the appearance of items shown in other GUIs.

For example, consider first image 301 of a motorcycle shown in first GUI 303a. Assume that first image 301 is an initial display/format of the motorcycle image shown in first GUI 303a. However, assume that when user 204 in FIG. 2 looked at test GUI 202, his eye was drawn to the larger image 210c. That is, as depicted in FIG. 3 the user 204 looked at second image 305 (analogous to image 210c in FIG. 2) on second GUI 307 (analogous to test GUI 202 in FIG. 2). This information tells computer 101 (shown in FIG. 1) to adjust first GUI 303a to form first GUI 303b, which depicts the altered first image 309, which is 1) larger (i.e., as is second image 305), 2) positioned in the center of first GUI 303b (instead of at the top, as shown in first GUI 303a), and/or 3) is the same color as second image 305.

Figure 4:
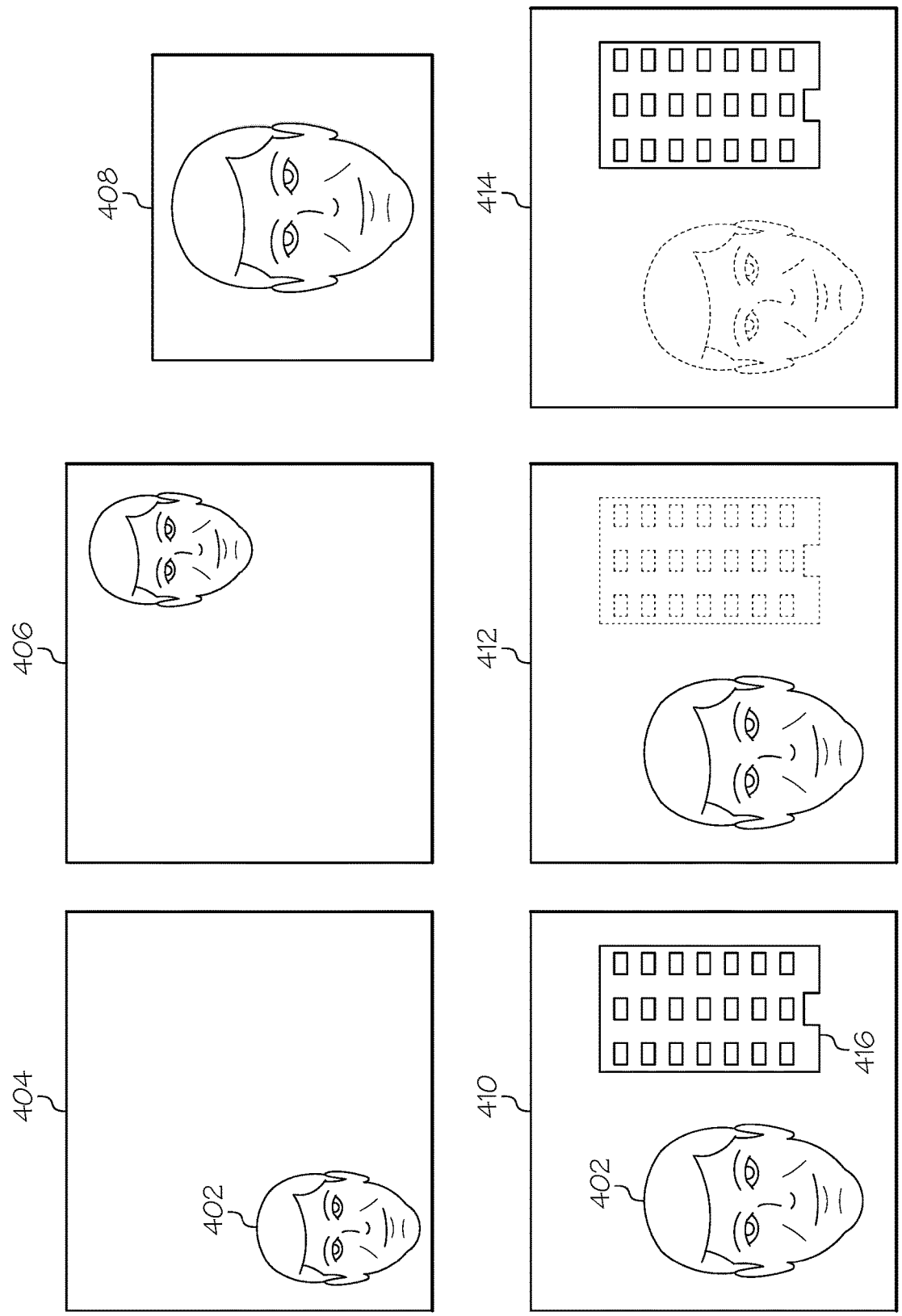
FIG. 4 illustrates various second GUIs being altered based on where the user looked on the test GUI shown in FIG. 2.

Other examples of GUIs being altered based on where the user looks on the test GUI shown in FIG. 2 are shown in FIG. 4.

For example, consider primary image 402 which is depicted in various GUIs.

Assume that the vision of user 204 was drawn to (i.e., looked at first, held his attention on for longer than a predetermined amount of time, etc.) area 208d in test GUI 202 (the "second GUI") shown in FIG. 2. As such, computer 101 will determine that this is the preferred area of focus on a GUI for user 204, and therefore will display primary image 402 on the left lower area of GUI 404 (the "first GUI").

However, if the vision of user 204 was drawn to area 208b in FIG. 2, then primary image 402 is displayed in the upper right area of GUI 406.

Similarly, if the vision of user 204 was drawn to area 208c in FIG. 2, then primary image 402 is displayed in the center of GUI 408, and/or GUI 408 is cropped (as depicted) such that the primary image 402 fills the entire GUI 408.

With regard to GUI 410, GUI 412, and GUI 414, assume that there are two images being displayed: primary image 402 and secondary image 416.

Assume that the vision of user 204 was not drawn to image 210d in FIG. 2. Therefore, in order to capture the attention of user 204, an image should not be muted or colored in a same manner as that of image 210d. If the generator of the GUI wants equal attention to be placed on both the primary image 402 and the secondary image 416, then neither image is muted/colored in the manner used by image 210d, as shown in GUI 410. However, if the system intends to draw attention to primary image 402, then secondary image 416 is muted/colored in the manner used by image 210, as shown in GUI 412. Similarly, if the system intends to draw attention to the secondary image 416 then primary image 402 is muted/colored in the manner used by image 210, as shown in GUI 414.

Figure 5:
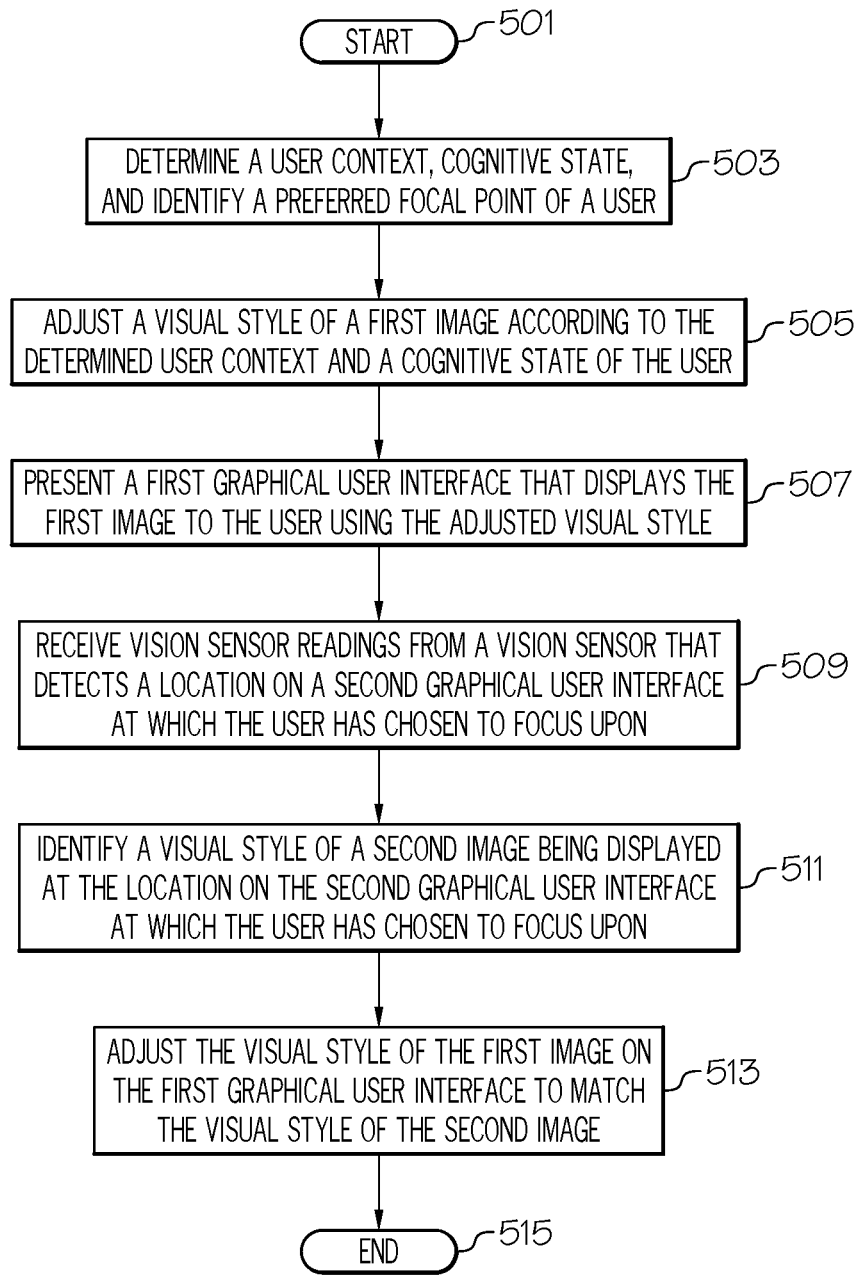
FIG. 5 is a high-level flow chart of one or more steps performed by one or more processors to modify a GUI in order to improve the usability of the GUI in accordance with one or more embodiments of the present invention.

With reference now to FIG. 5, a high-level flow chart of one or more steps performed by one or more processors to modify a GUI in order to improve the usability of the GUI in accordance with one or more embodiments of the present invention is presented.

After initiator block 501, one or more processors (e.g., processor 103 shown in FIG. 1) determine a user context and a cognitive state of a user (e.g., user 204 show in FIG. 2), as described in block 503. Examples of the user context and the cognitive state are provided below. Furthermore, the processor(s) identify a preferred focal point for the user (e.g., positioning on the GUI, selection of colors and/or hue muting, etc.). That is, the preferred focal point for the user is a focal point that is deemed to be preferred according to the user belonging to a particular user cohort, or is established by the user's response to the test GUI 202 when presented to the user. For example, upon an initial presentation of test GUI 202 to user 204, the user 204 will first direct his vision towards certain images displayed on the test GUI 202, certain areas on the test GUI 202, certain sized/colored objects displayed on the test GUI 202, etc. These preferences are thus used to identify the preferred focal point (i.e., features that draw the user's attention) of the user 204. Similarly, if the user 204 returns to certain images/locations/etc. on the test GUI 202, including for periods of time longer than a predetermined length of time (e.g., the user 204 gazes at a certain area/image for more than 10 seconds), then the area/image/style/etc. of what the user 204 is gazing is deemed to be his preferred focal point. Thus, in one or more embodiments of the present invention, the "preferred focal point" is not selected by the user (e.g., by stating a preference for focal points/styles), but rather is selected on behalf of the user based on that user's reaction to the test GUI 202 and/or based on being a member of a certain user cohort.

As described in block 505, the processor(s) adjust a visual style of a first image (e.g., first image 301 shown in FIG. 3) according to the determined user context and cognitive state of the user.

As described in block 507, the processor(s) present a first graphical user interface (e.g., first GUI 303b shown in FIG. 3) that displays the first image to the user using the adjusted visual style (e.g., as the altered first image 309 shown in FIG. 3).

As described in block 509 in FIG. 5, the processor(s) receive vision sensor readings from a vision sensor (e.g., vision sensor 206 shown in FIG. 2) that detects a location on a second graphical user interface (e.g., test GUI 202) at which the user 204 is looking.

As described in block 511, the processor(s) identify a visual style of a second image being displayed at the location on the second graphical user interface at which the user has chosen to focus upon. As described herein, this "visual style" may be positioning on the GUI, size of the image, color of the image, color muting/shading of the image, and/or the subject matter itself. For example, if the user 204 shown in FIG. 2 is drawn to the image 210b of a boat, and the original image being displayed on the first GUI (e.g., a first iteration of a Web page for user 204) shows a car, and an image of a boat would meet the same purpose as an image of a car, then the Web page is automatically altered by computer 101 to display a boat instead of a car.

As described in block 513, the processor(s) adjust the visual style of the first image on the first graphical user interface to match the visual style of the second image (see FIG. 4). Thus, the system generates a new focal point (i.e., visual characteristic) for a displayed image (e.g., using positioning, color, brightness, etc.) in order to evoke a change in focus/gaze by the user. In one or more embodiments, this information is used to place a user into a certain user cohort, and/or to customize the user cohort, improve the user cohort, and allow the user cohort to learn about the characteristics of its members.

The flow chart shown in FIG. 5 ends at terminator block 515.

In an embodiment of the present invention, the cognitive state of the user is identified by a user cohort to which the user belongs. For example, assume that a profile of user 204 indicates that he/she has a certain neurological/developmental disorder. As such, he/she would be in a user cohort of similar persons. If prior iterations have shown that such persons prefer a certain visual style for images being displayed on the GUI, then this certain visual style will likewise be used for content being presented to user 204.

In an embodiment of the present invention, one or more processors (e.g., within computer 101 shown in FIG. 1) receive biometric sensor output from a biometric sensor (e.g., biometric sensor 212 shown in FIG. 2) that is monitoring the user in real-time. The processor(s) assess the cognitive state of the user based on the biometric sensor output from the biometric sensor that is monitoring the user in real-time, and adjust the visual style of the images according to the biometric sensor output from the biometric sensor that is monitoring the user in real-time. For example, if the biometric sensor 212 detects that user 204 is highly agitated, then the system may mute the visual image on the GUI. However, if the biometric sensor 212 detects that the user 204 is drifting off to sleep, then the system may change the visual appearance of the image(s) to a brighter color, a flashing image, etc.

In an image of the present invention, the processor(s) receive a physical location sensor output (e.g., from location and positioning sensor 151 shown in FIG. 1) that identifies a current physical location of the user, and then adjusts the visual style of the images according to the current physical location of the user. For example, user 204 may be at home in a public location, at work, etc., as determined by the location and positioning sensor 151 shown in FIG. 1. As such, a large image may be appropriate for display on the GUI while the user is at work (where security is not an issue), but a smaller or shaded/muted/covered image may be more appropriate in a public area such as a coffee shop (where security is more important).

In an embodiment of the present invention, the processor(s) determine whether the user is viewing the graphical user interface with one or more other users and, in response to determining that the user is viewing the graphical user interface with one or more other users, adjust the visual style of the images. For example, assume that the transceiver 123 shown in FIG. 1 detects short range signals from presence devices held by two (or more) different users. These devices may or may not identify the two users. If they do not, then the system may default to the original display of the images (i.e., unaltered for user 204 as described herein), since the alterations described herein are tailored for user 204. However, if the two presence devices do identify the two users, then the system will harmonize the preferences of the two users. For example, if a first user prefers large images and the second user prefers red images, then the system will present large and red images to the two users.

In an embodiment of the present invention, the processor(s) determine that the user is in a user cohort that prefers images having a brightness that is below a predetermined level and, in response to determining that the user is in the user cohort that prefers images having the brightness that is below the predetermined level, adjusts the brightness of the images displayed on the graphical user interface to that which is below the predetermined level. For example, assume that user 204 has a profile (e.g., as identified in a user profile database) that indicates that user 204 is in a user cohort of persons having a certain neurological condition that need dimmed images to be displayed. Since user 204 is part of this cohort, images presented on a GUI to user 204 will be dimmed to a predetermined level. Alternatively, user 204's profile may indicate that user 204 belongs to a cohort requiring brighter images to facilitate viewing on a GUI. In this embodiment, the images presented on the GUI to user 204 are brightened to a level that has been predetermined according to the user cohort.

In an embodiment of the present invention, one or more processors determine that the user is in a user cohort that prefers images that utilize colors from a predefined group of colors and, in response to determining that the user is in a user cohort that prefers images that utilize colors from the predefined group of colors, adjusts the color of the images displayed on the graphical user interface by using the colors from the predefined group of colors. For example, if user 204 is a young user, then certain primary colors may be used to shade the displayed images.

In an embodiment of the present invention, one or more processors determine that the user is in a user cohort of a predefined age range in which its members prefer a particular visual style for images displayed on the graphical user interface and, in response to determining that users in the user cohort prefer the particular visual style for images displayed on the graphical user interface, adjusts images displayed on the graphical user interface by using the particular visual style preferred by the users in user cohort. For example, if the user cohort is made up of older users, then nostalgic references to particular landscapes, older towns, etc. may be incorporated into the GUI image, in order to capture and/or retain the interest/attention of the viewers.

In an embodiment of the present invention, one or more processors determine that the user is in a user cohort having a certain set of knowledge and determine that users in the user cohort prefer a particular visual style for images displayed on the graphical user interface. Thus, in response to determining that users in the user cohort prefer the particular visual style for images displayed on the graphical user interface, the processor(s) adjust images displayed on the graphical user interface by using the particular visual style preferred by the users in user cohort. For example, if the user's profile shows that he/she has traveled to a certain area on vacation, or has a degree in a certain area, or has written on certain topics, then the images displayed on the GUI may be adjusted to depict such places, subject matter, or topics.

In an embodiment of the present invention, one or more processors retrieve user-inputs by the user to a social network describing a preferred visual style of the user, and then adjust images displayed on the graphical user interface by using the preferred visual style found in the user-inputs by the user to the social network. For example, if the user has put in his/her social media profile that he/she likes a certain type of animal, then the system will insert an image of this type of animal in the Web page (GUI) to capture the attention of that user.

In an embodiment of the present invention, adjusting the visual style of the image is achieved by adjusting a positioning of the image displayed on the graphical user interface (e.g., see GUI 404 and/or GUI 406 in FIG. 4).

In an embodiment of the present invention, adjusting the visual style of the image is achieved by adjusting a resolution of the image displayed on the graphical user interface (e.g., see GUI 412 and/or GUI 414 in FIG. 4).

In an embodiment of the present invention, adjusting the visual style of the image is achieved by adjusting a size of the image displayed on the graphical user interface (e.g., see first GUI 303b shown in FIG. 3).

In an embodiment of the present invention, adjusting the visual style of the image comprises presenting multiple copies of the image on the graphical user interface. For example, assume that user 204 looked quickly at multiple images on test GUI 202 shown in FIG. 2. This is indicative of a preference of user 204 to receive many (diverse) images at once on a single GUI. As such, the Web page/GUI generated and shown to user 204 will include multiple variations of a same image (e.g., an image of a same car in different colors) or multiple different images (e.g., images of different makes/models of cars), thus allowing the user 204 to compare the different images/cars.

In an embodiment of the present invention, adjusting the visual style of the image is achieved by adjusting a format of a gallery made up of presenting multiple copies of the image on the graphical user interface. For example, assume that a GUI includes multiple images. User 204 may prefer to see these different images in a vertically oriented gallery (in which each image is positioned above/below another image), a horizontally oriented gallery (in which each image is positioned next to another image), a slide show gallery (in which each image is shown alone and in sequence on the GUI), or in a montage gallery (in which images are rapidly shown serially). This preference may be derived by the user's profile of preferences or based on his/her response to the test GUI 202 shown in FIG. 2. For example, assume that test GUI 202 showed both a vertically oriented gallery of images and an horizontally oriented gallery of images, and that the attention/gaze of user 204 was drawn to the vertically oriented gallery of images. Thus, the system will configure other GUIs to display their images in a vertically oriented gallery of images.

In an embodiment of the present invention, a second graphical user interface displays a webpage, and the method further includes inserting, by one or more processors, a new image into the webpage, where the new image comports with the adjusted visual style used by the first graphical user interface. For example, assume that a new (or existing) webpage is to be presented to the user. The system will utilize the adjusted visual style (e.g., image selection, image placement, image coloring/shading/etc.) with the new image that is inserted into the web page, such that this new image has a same visual style and focal point as the first image that was presented on the first graphical user interface.

In an embodiment of the present invention, one or more processors assign the user to a user cohort, in which the user shares focal point preferences with other members of the user cohort. For example, all (or at least most) of the members of the user cohort may prefer large images that are displayed in a center portion of a GUI. However, over time, these focal point preferences are detected by the processor(s) as changing, as evidenced by new preferences stated in a questionnaire by the cohort members, by new test results showing where the users look when presented with new test GUIs, etc. As such, the system learns about the changing preferences of the cohort members, and the processor(s) further adjust the initial adjusted visual style to reflect the change to the focal point preferences of the members of the user cohort.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
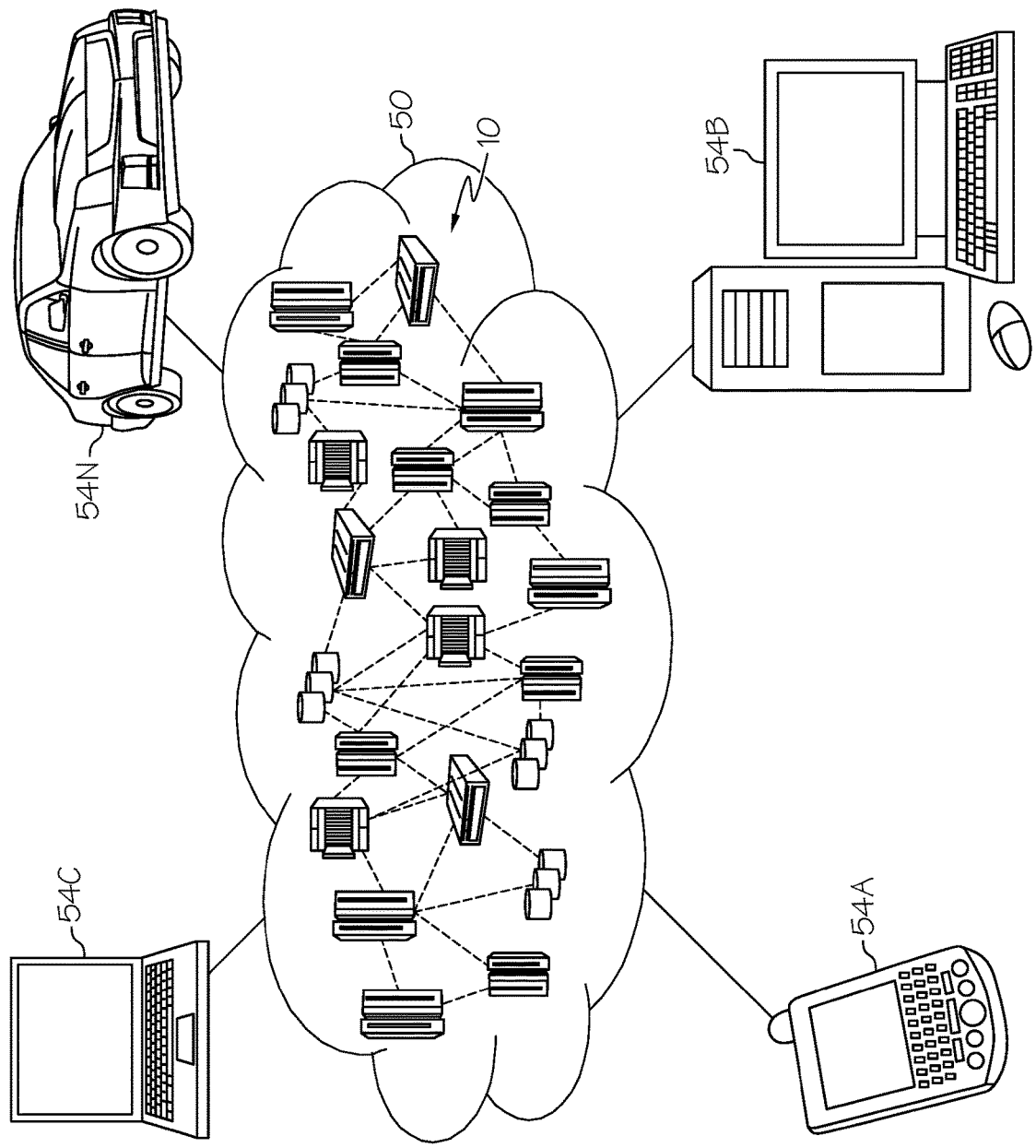
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
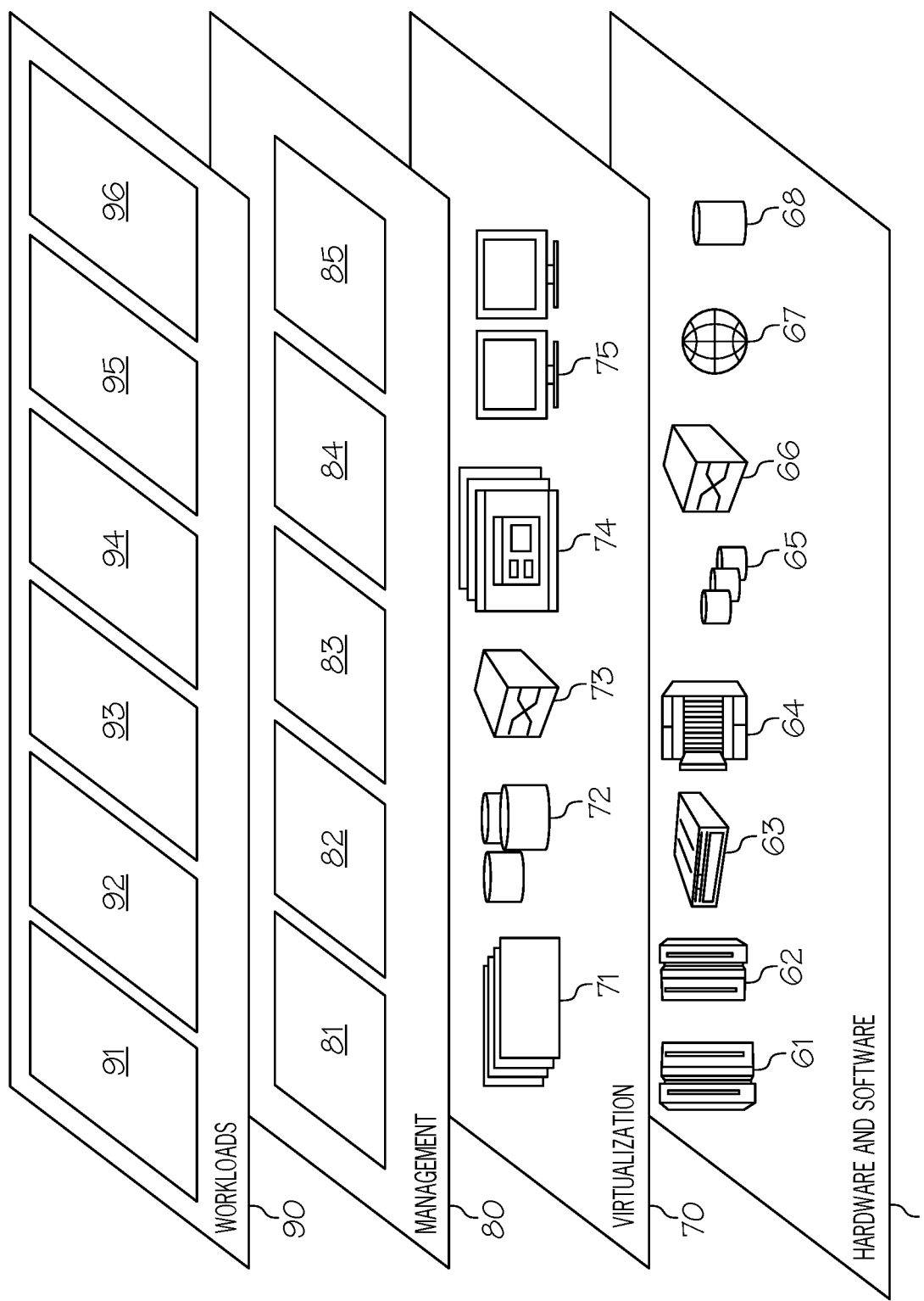
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI modification processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A method comprising:
  determining, by one or more processors, a user context and a cognitive state of a user, wherein the user context is defined by a location type of a current physical location of the user;

identifying, by one or more processors, a preferred focal point for the user, wherein the preferred focal point is a visual appearance of a first image being displayed on a test graphical user interface and selected by the user as the preferred focal point for the user;

adjusting, by one or more processors, a visual style of other images displayed on a first graphical user interface according to the determined user context and cognitive state of the user and the identified preferred focal point for the user, wherein the other images are multiple images that are displayed contemporaneously on the first graphical user interface as a scene, and wherein the test graphical user interface and the first graphical user interface are different graphical user interfaces;

applying, by one or more processors, the adjusted visual style to each of the other images in a sequential manner, wherein applying the adjusted visual style to each of the other images in the sequential manner guides the user to move a gaze of the user through the scene in a directed and controlled manner; and presenting, by one or more processors, the first graphical user interface that displays the other images to the user using the adjusted visual style.

2. The method of claim 1, further comprising:
receiving, by one or more processors, vision sensor readings from a vision sensor that detects a location on a second graphical user interface at which the user is looking;

identifying, by one or more processors, a visual style of a second image being displayed at the location on the second graphical user interface upon which the user has chosen to focus; and adjusting, by one or more processors, the visual style of the first image on the first graphical user interface to match the visual style of the second image.

3. The method of claim 1, wherein the visual appearance of the first image is caused by applying a level of visual muting of the first image.

4. The method of claim 1, further comprising:
receiving, by one or more processors, biometric sensor output from a biometric sensor that is monitoring the user in real-time;

assessing, by one or more processors, the cognitive state of the user based on the biometric sensor output from the biometric sensor that is monitoring the user in real-time; and adjusting, by one or more processors, the visual style of the first image according to the biometric sensor output from the biometric sensor that is monitoring the user in real-time.

5. The method of claim 1, further comprising:
receiving, by one or more processors, a physical location sensor output that identifies the current physical location of the user;

establishing, by one or more processors, the user context according to the current physical location of the user; and adjusting, by one or more processors, the visual style of the first image according to the current physical location of the user.

6. The method of claim 1, further comprising:
determining, by one or more processors, whether the user is concurrently viewing the first graphical user interface with one or more other users; and in response to determining that the user is concurrently viewing the first graphical user interface with one or more other users, adjusting, by one or more processors, the visual style of the first image based on a combination of preferred focal points of the user and the one or more other users.

7. The method of claim 1, further comprising:
determining, by one or more processors, that the user is in a user cohort that prefers images having a brightness that is below a predetermined level; and in response to determining that the user is in the user cohort that prefers images having the brightness that is below the predetermined level, adjusting, by one or more processors, the brightness of the images displayed on the first graphical user interface to that which is below the predetermined level.

8. The method of claim 1, further comprising:
determining, by one or more processors, that the user is in a user cohort that prefers images that utilize colors from a predefined group of colors; and in response to determining that the user is in a user cohort that prefers images that utilize colors from the predefined group of colors, adjusting, by one or more processors, the colors of the images displayed on the first graphical user interface by using the colors from the predefined group of colors.

9. The method of claim 1, further comprising:
determining, by one or more processors, that the user is in a user cohort having a certain set of knowledge;

determining, by one or more processors, that users in the user cohort prefer a particular visual style for images displayed on the first graphical user interface; and in response to determining that users in the user cohort prefer the particular visual style for images displayed on the first graphical user interface, adjusting, by one or more processors, images displayed on the first graphical user interface by using the particular visual style preferred by the users in the user cohort.

10. The method of claim 1, further comprising:
retrieving, by one or more processors, user-inputs by the user to a social network describing a preferred visual style of the user; and adjusting, by one or more processors, images displayed on the first graphical user interface by using the preferred visual style found in the user-inputs by the user to the social network.

11. The method of claim 1, wherein said adjusting the visual style of the first image comprises adjusting a positioning of the first image by displaying the first image on a particular location on the first graphical user interface.

12. The method of claim 1, wherein said adjusting the visual style of the first image comprises adjusting a resolution of the first image displayed on the first graphical user interface.

13. The method of claim 1, wherein said adjusting the visual style of the first image comprises adjusting a size of the first image displayed on the first graphical user interface based on whether the current physical location of the user is the public location or the private location.

14. The method of claim 1, wherein said adjusting the visual style of the first image further comprises adjusting a directional orientation of a gallery made up of presenting the multiple copies of the first image on the first graphical user interface.

15. The method of claim 1, wherein a second graphical user interface displays a webpage, and wherein the method further comprises:

inserting, by one or more processors, a new image into the webpage, wherein the new image comports with the adjusted visual style used by the first graphical user interface.

16. The method of claim 1, wherein the other images are multiple images that are displayed contemporaneously on the first graphical user interface as a scene, and wherein the method further comprises:
applying, by one or more processors, the adjusted visual style to each of the other images in a sequential manner, wherein applying the adjusted visual style to each of the other images in the sequential manner guides the user to move a gaze of the user through the scene in a directed and controlled manner.

17. A method comprising:
determining, by one or more processors, a user context and a cognitive state of a user, wherein the user context is defined by a location type of a current physical location of the user;
identifying, by one or more processors, a preferred focal point for the user, wherein the preferred focal point is a visual appearance of a first image being displayed on a first graphical user interface and selected by the user as the preferred focal point for the user, and wherein the first graphical user interface is a test interface;
adjusting, by one or more processors, a visual style of the first image by presenting multiple copies of the first image on a second graphical user interface, wherein the test graphical user interface and the second graphical user interface are different graphical user interfaces; and
presenting, by one or more processors, the second graphical user interface that displays the multiple copies of the first image to the user using the adjusted visual style of the first image.

18. A method comprising:
determining, by one or more processors, a user context and a cognitive state of a user, wherein the user context is defined by a location type of a current physical location of the user;
identifying, by one or more processors, a preferred focal point for the user, wherein the preferred focal point is a visual appearance of a first image being displayed on a test graphical user interface and selected by the user as the preferred focal point for the user;
determining, by one or more processors, that the user has traveled to a particular geolocation;
retrieving, by one or more processors, a second image of a physical entity at the particular geolocation;
determining, by one or more processors, that the second image of the physical entity at the particular geolocation attracts an attention of the user; and
in response to determining that the second image of the physical entity at the particular geolocation attracts the attention of the user, inserting into a webpage displayed on another graphical user interface, by one or more processors, the second image of the physical entity on said another graphical user interface at the preferred focal point for the user, wherein the test graphical user interface and said another graphical user interface are different graphical user interfaces.

* * * * *